May 27, 1930.    R. B. HOCHSTADTER ET AL    1,760,697

EGG CANDLER

Filed July 25, 1928    2 Sheets-Sheet 1

Roy B. Hochstadter
and Frank Hochstadter
INVENTOR

BY Victor J. Evans
ATTORNEY

May 27, 1930.   R. B. HOCHSTADTER ET AL   1,760,697
EGG CANDLER
Filed July 25, 1928   2 Sheets-Sheet 2

Roy B. Hochstadter
and Frank Hochstadter
INVENTOR
BY Victor J. Evans
ATTORNEY

Patented May 27, 1930

1,760,697

UNITED STATES PATENT OFFICE.

ROY B. HOCHSTADTER AND FRANK HOCHSTADTER, OF BROOKLYN, NEW YORK

EGG CANDLER

Application filed July 25, 1928. Serial No. 295,270.

This invention relates to an egg candler, the general object of the invention being to provide a casing containing an electric lamp and having a spring pressed hinged part having an egg receiving opening therein, with means whereby the circuit of the lamp will be automatically closed when an egg is pressed into the opening to swing the member inwardly, the circuit being broken again when the egg is withdrawn by the spring pressing the member outwardly to its normal position.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
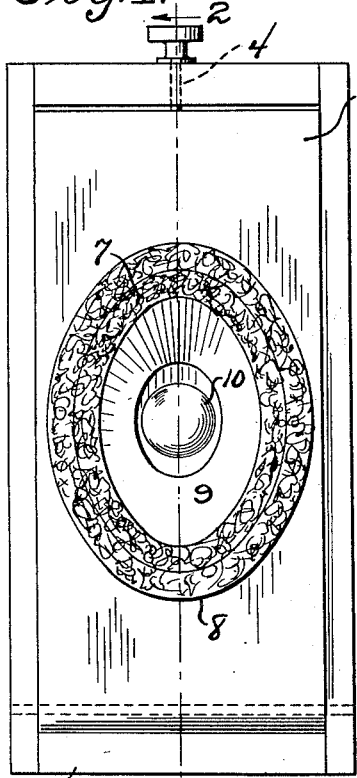
Figure 1 is an elevation showing one form of the invention.
Figure 2:
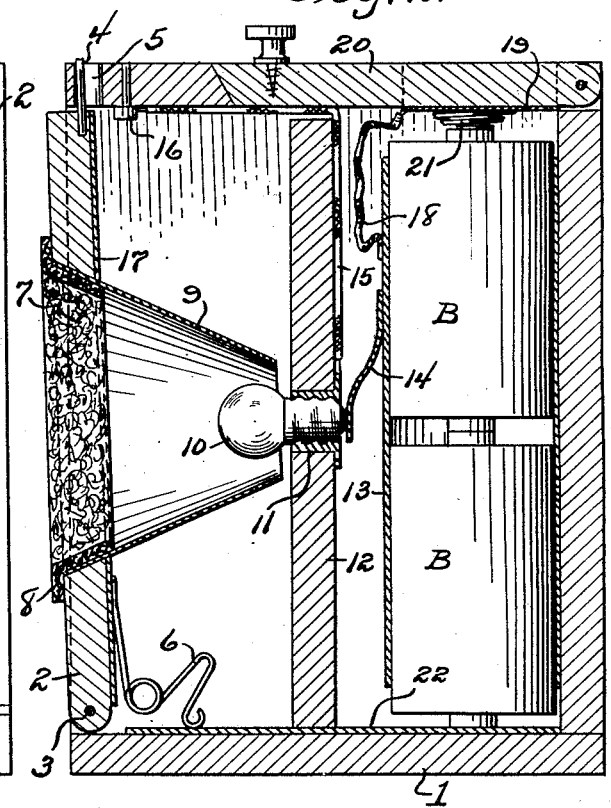
Figure 2 is a section on line 2—2 of Figure 1.
Figure 3:
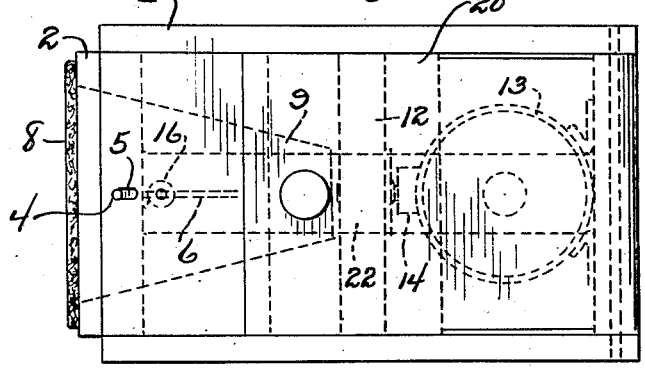
Figure 3 is a plan view.

Referring to Figures 1, 2 and 3, the numeral 1 indicates a casing which has its front open and 2 indicates a member closing the opening, said member being hingedly connected with the casing at one end, as shown at 3, and having a pin 4 at its other end which engages a slot 5 in the casing so that the member has limited rocking movement on its hinge. A spring 6 normally holds the member in its outward position with the pin 4 engaging the outer end of the slot 5. An opening 7 is arranged in the member 2, said opening having flaring walls and being of substantially oval shape and with a cushion 8 of felt or the like covering the walls of the opening and that part of the outer face of the member 2 which is adjacent the opening.
A conical reflector 9 is connected with the inner face of the member 2 and surrounds the opening and its small end surrounds the bulb 10 which fits in a socket 11 carried by a partition 12 in the casing so that the rays of light from the lamp bulb will pass through the opening and thus illuminate an egg placed in said opening, it being understood that the opening with the cushion on its walls is of such a size as to partly receive an egg so that the rays of light must pass through the egg and thus permit the egg to be inspected to see whether or not it is defective.

A battery holder 13 is placed in the rear chamber of the casing formed by the partition 12 and this holder is arranged to receive the batteries B. A contact spring 14 has one end connected with the holder and its other end engages the central contact of the lamp bulb and a conductor 15 connects the socket 11 with a contact 16 on the casing and which is engaged by a metal plate 17 fastened to the under face of the member 2 when said member is moved inwardly. A conductor 18 connects the holder with a plate 19 fastened to a door 20 which closes an opening in the upper end of the casing and a spring 21 is carried by the plate 19 and engages a terminal of one of the batteries B. A terminal of the other battery bears against a plate 22 at the lower part of the casing and a part of the spring 6 is in contact with this plate and another part of the spring is in contact with the plate 17. Thus it will be seen that the spring 6 normally holds the member 2 with its plate 17 out of engagement with the contact 16 so that the circuit to the lamp 10 is broken. When an egg is placed in the opening in the member 2, the said member will be swung inwardly against the action of its spring 6 so that the plate 17 will engage the contact 16 and thus the circuit from the batteries to the lamp will be closed. As soon as the egg is removed, the spring 6 will return the member 2 to its normal position and thus break the circuit to the lamp. The door 20 provides access to the parts and when closed, will hold the spring 21 against the batteries so as to insure perfect contact between the parts.

Figure 4:
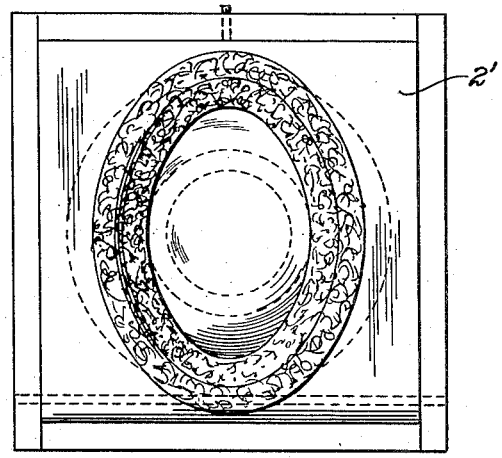
Figure 4 is an elevation showing a modification.
Figure 5:
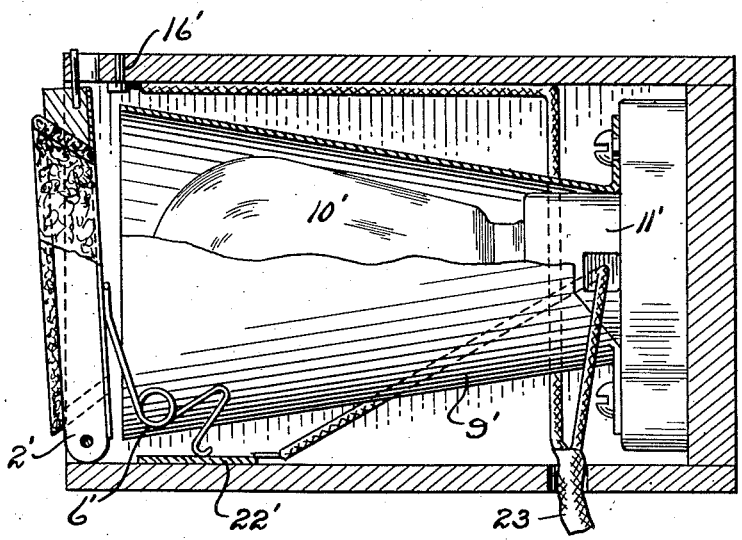
Figure 5 is a vertical sectional view through Figure 4.

In the modification shown in Figures 4 and 5, an ordinary electric lamp 10' is used so that the device can be connected to a house system instead of using the small batteries shown in the first form of the invention. In this case, an ordinary socket 11' is placed in the casing to receive the bulb 10' and the reflector 9' is fastened to the base of the socket and encloses the lamp and is so arranged that it will reflect the light rays through the opening in the member 2' which is of the same construction as that before described. The conductors 23 pass through a hole in the casing, with one conductor connected with the contact 16' and the other with the lamp and with a plate 22' with which the spring 6' engages. Thus when an egg is placed in the opening in the member 2', the circuit to the lamp will be closed and thus the egg will be illuminated and when the egg is removed, the circuit will be broken.

It is thought from the foregoing description that the advantages and novel features of the invention will be readily apparent.

It is to be understood that changes may be made in the construction and in the combination and arrangement of the several parts, provided that such changes fall within the scope of the appended claim.

What we claim is:—

An egg candling device comprising a casing having an opening therein with a hole in the top over the opening, a member closing the opening and hingedly connected at its lower end to the casing, a pin carried by the upper end of the said member and engaging the hole in the top of the casing whereby movement of the member is limited, a spring in the casing and bearing against the inner lower part of the member for holding the pin at the outer wall of the hole, said member having an oval-shaped hole therein, a reflector of conical shape having its large end passing through said oval hole, with its small end arranged in the casing, a cushion carried by the large end of the reflector, an electric bulb in the casing surrounded by the small end of the reflector, a circuit for the bulb and means for closing the circuit by the inward movement of the member.

In testimony whereof we affix our signatures.

ROY B. HOCHSTADTER.
FRANK HOCHSTADTER.